United States Patent
Fishler et al.

(10) Patent No.: US 6,370,583 B1
(45) Date of Patent: Apr. 9, 2002

(54) METHOD AND APPARATUS FOR PORTRAYING A CLUSTER OF COMPUTER SYSTEMS AS HAVING A SINGLE INTERNET PROTOCOL IMAGE

(75) Inventors: Leonard Fishler, Cupertino; Bahman Zargham, Sunnyvale; Stuart Monks, Castro Valley, all of CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/136,008

(22) Filed: Aug. 17, 1998

(51) Int. Cl.[7] .................. G06F 15/173; G06F 15/16
(52) U.S. Cl. ............................. 709/238; 709/245
(58) Field of Search ........................ 709/201, 238, 709/245, 203

(56) References Cited

U.S. PATENT DOCUMENTS

| | | | | |
|---|---|---|---|---|
| 5,371,852 A | * | 12/1994 | Attanasio et al. | 709/245 |
| 5,761,507 A | * | 6/1998 | Govett | 709/101 |
| 5,918,017 A | * | 6/1999 | Attanasio et al. | 709/224 |
| 6,061,349 A | * | 5/2000 | Coile et al. | 370/389 |
| 6,119,143 A | * | 9/2000 | Dias et al. | 709/201 |
| 6,134,673 A | * | 10/2000 | Chrabaszcz | 714/13 |
| 6,138,159 A | * | 10/2000 | Phaal | 709/226 |
| 6,151,688 A | * | 11/2000 | Wipfel et al. | 714/48 |

\* cited by examiner

Primary Examiner—Dung C. Dinh
Assistant Examiner—Bradley Edelman
(74) Attorney, Agent, or Firm—Leah Sherry; Oppenheimer Wolff & Donnelly LLP

(57) ABSTRACT

A method and apparatus for presenting the multiple processors of a cluster as a single virtual host to a network wherein the processors are communicatively coupled among themselves and to a network interface. The network interface is communicatively coupled to the network. One of the processors is designated a primary parallel I/O processor. One address is advertised on said network for said multiple processors, and filter trees in the network interface direct the interface to forward packets from the network addressed to that address to the primary parallel I/O processor. Later, the filter tree is modified to direct the network interface to forward a specific subset of the packets directly to a particular processor.

9 Claims, 6 Drawing Sheets

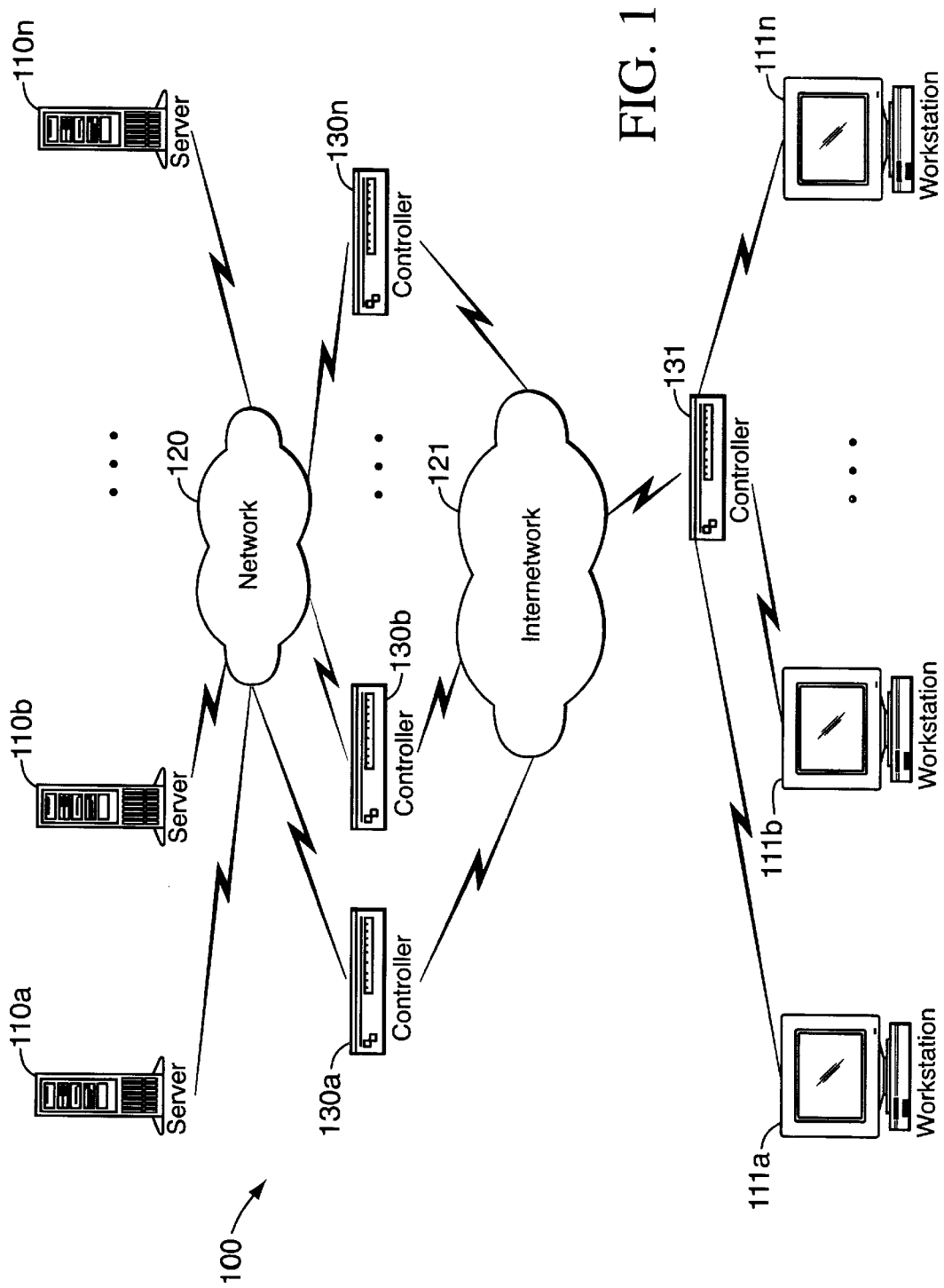

METHOD AND APPARATUS FOR PORTRAYING A CLUSTER OF COMPUTER SYSTEMS AS HAVING A SINGLE INTERNET PROTOCOL IMAGE

RELATED APPLICATIONS

U.S. patent application Ser. No. 09/135,027 entitled "Method and Apparatus for Filtering and Routing Communication Frames," filed on the same date as the instant application, naming as inventors Dean Ujihara, Leonard R. Fishler, Richard Mayfield and Bahman Zargham, under an obligation of assignment to the assignee of this invention.

This invention relates to communication over networks, including internetworks and intranetworks. More particularly, this invention relates to the routing of communication fra such networks.

BACKGROUND OF THE INVENTION

FIG. 1 is an illustration of a typical communications internetwork 100 of the prior art. In FIG. 1, processors 110a, 110b, ..., 110n interconnect by means of the network 120. I/O controllers 130a, 130b, ..., 130n also connect to the network 120.

Within their respective processors 110, I/O processes are the initial consumers of the data transported over the network 120.

Processors 111a, 111b, ..., 111n and the network 120 connect to the internetwork 121 by means of the gateways 131 and 130, respectively.

In the multiprocessor systems available from the assignee of the instant invention, constituent processors 110a–n cooperate to distribute the workload among themselves. The I/O processes are ordered such that one such process is designated the primary I/O process. Each of the controllers 130 communicates frames from the network 120 directly to only (the processor 110a, for example, running) that primary I/O process. The primary I/O process has the responsibility to determine the actual destination processor 110a–n of a frame and to forward that frame from its processor 110a to the destination processor 110b–n. Processor-to-processor copying effects the forwarding.

Funneling all frames to the processor 110a of the primary I/O process places a significant burden on that processor 110a. Further, assuming that the actual destinations of the frames are evenly distributed among the processors 11a–n of the multiprocessor system 100, at least one-half of the frames forwarded to the processor 110a of the primary I/O process must be subjected to an inter-processor copy, tying up the resources of both the primary I/O processor 110a and the destination processor 110b–n, as well as the network 120. As the number of processors in the multiprocessor system increases beyond two, the percentage of frames subject to an inter-processor copy increases.

Further, a clustered system or even a replicated shared-memory multiprocessor (SMP) system appears to be many servers to the outside, reducing the quality of service perceived by consumers of the service. SMPs also have limits to growth, leading to replication and its attendant cost of replicated content.

Therefore, there is a need for a computer system which takes advantage of the better scaling capabilities of a clustered system, avoiding the extra overhead of copying data between processors due to the lack of shared memory.

Accordingly, a goal of the invention is to allow a clustered system to appear as a single system to clients interfacing to it using standard Internet protocols (e.g., TCP/IP, UDP/IP)

Another goal is to allow multiple interfaces (LAN, ATM, etc.) to a system to transparently appear to devices external to the system as a single internetwork address. For example, the interfaces could appear as a single address according to the Internet Protocol (IP) standards. (Widely known in the art, the IP, TCP and UDP standards are available, for example, at http://www.pmg.lcs.mit.edu/rfc.html as Requests for Comments (RFCs) 791, 793 and 768. RFCs 791, 793 and 768.)

Yet another goal is to distribute data directed to a specific interface (LAN, ATM, etc.) across more than one processor in a cluster, without the data first traveling through another processor.

Another object is a flexible data distribution method, permitting distribution at least at the level of a TCP/IP socket or its equivalent.

Still another object is to achieve the above objects without any changes to clients interfacing to the system by means of Internet protocols.

SUMMARY OF THE INVENTION

According to one aspect of the invention, a cluster of processors is connected to a network by a network adapter and the cluster is assigned a single network address. When a client requests a connection to a particular port on one of the processors the network adapter is configured to directly route packets to the processor owning the port. Thus, routing all packets through one processor is avoided.

According to another aspect of the invention, the multiple processors of a cluster are presented as a single virtual host to a network. The processors are communicatively coupled among (i.e., "between" or "among") themselves and to a network adapter. The network adapter is communicatively coupled to the network. One of the processors is designated a primary parallel I/O processor.

According to another aspect of the invention, one address is advertised on said network for said multiple processors, and the network adapter is directed to forward packets from the network addressed to that address to the primary parallel I/O processor. Later, the network adapter is directed to forward a specific subset of the packets directly to a particular processor.

According to another aspect of the invention, the directing of the network adapter is accomplished with filter trees.

The invention achieves the degree of data sharing possible in a SMP and allows SMP economics but with much greater scalability. It also allows a single clustered system to economically address large servers for the Internet, eliminating the classic problem of replication of servers and content, and the transmission of multiple server names to which to retry multiple attempts to connect.

A system embodying the invention can distribute incoming data among the multiple processors of a cluster without inter-processor copying. Further, a fat pipe will not overwhelm any individual processor. The invention applies the pipe to the whole cluster.

BRIEF DESCRIPTION OF THE DRAWINGS

FIG. 1 is an illustration of a typical communications internetwork of the prior art.

DESCRIPTION OF THE PREFERRED EMBODIMENT

Scenario

FIG. 1 is an illustration of a typical communications internetwork 100 of the prior art. In FIG. 1, processors 110a, 110b, . . . , 110n interconnect by means of the system area/cluster network 120. I/O controllers 130a, 130b, . . . , 130n also connect to the system area/cluster network 120.

Within their respective processors 110a–n, I/O processes are the initial consumers of the data transported over the system area/cluster network 120.

In the multiprocessor systems available from the assignee of the instant invention, constituent processors 110a–n cooperate to distribute the workload among themselves. The I/O processes are ordered such that one such process is designated the primary I/O process.

Figure 2A:
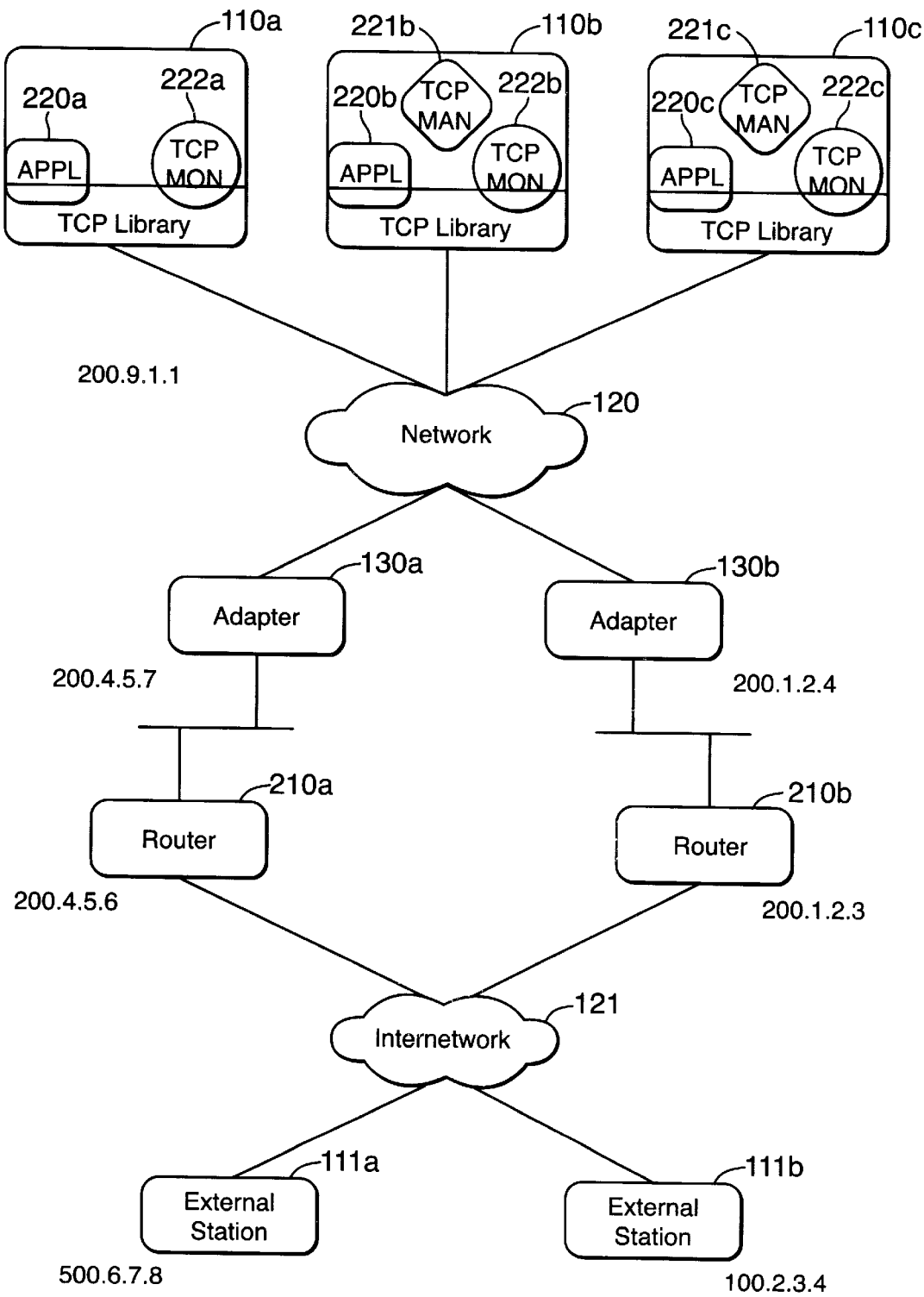
FIG. 2A is a simplified version of the internetwork illustrated in FIG. 1.

FIG. 2A is a simplified version of the internetwork 100 illustrated in FIG. 1. In FIG. 2A, the processors 110a–c run respective application processes 220a–c and TCP monitor processes 222a–c. Further, the processors 110b and 110c run the backup and primary TCP management processes 221b and 221c, respectively. The processors 110a–c are connected to the system area/cluster network 120 which is further connected to the network adapters 130a–b.

The routers 210a–b, previously shown as part of the internetwork 121 in FIG. 1, are shown separately in FIG. 2A. The routers 210a–b are connected to respective network adapters 130a–b. The routers 210a–b are also connected to the internetwork 121, to which are connected the clients 111a–b.

Figure 2B:
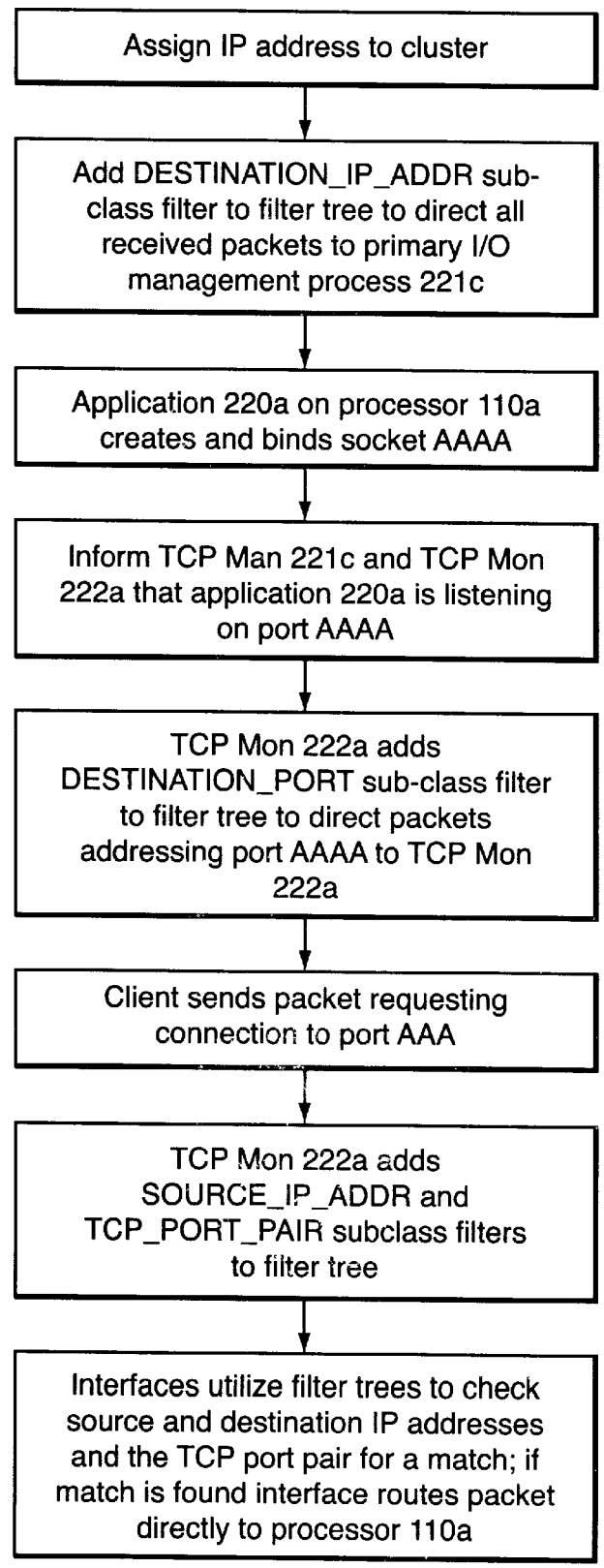
FIG. 2B is a flowchart depicting the steps of distributing incoming data among multiple processors in a cluster without inter-processor copying.

The distribution of incoming messages on the system of FIG. 2A will now be described with reference to the flowchart of FIG. 2B. On system start-up, an administrator directly or indirectly determines the Internet Protocol (IP) address for the system 250 connected by the system area/cluster network 120. Assume that this address is 200.9.1.1.

The primary process 221c managing the parallel I/O for the system 25D takes this information and directs the network adapters 130a–b to direct all packets destined for the IP address 200.9.1.1 (i.e., for the system 250 in general) to the processor 110c on which the primary parallel I/O management process 221c resides.

(The first hop routers 210a–b are told where to route packets bound for the network 200.9.x.x.)

An application 220a on processor 110a creates a socket and "binds" the port numbered AAAA to that socket. The application 220a can now "listen" on that port AAAA. By issuing the socket "listen" and "accept" calls, application 220a informs the TCP management process 221c that it is listening on that port. The TCP management process 221c thus knows which port numbers are being listened to from which processors 110a–c.

The TCP monitor process 222a in processor 110a also receives this information. This process creates a destination IP/destination port-type filter, with the filtering parameters of the IP address 200.9.1.1. and the port number AAAA in each of the network adapters 130a–b. This filter creation occurs according to the Filter Management Protocol (FMP) described in U.S. patent application Ser. No. 09/135,027 (Attorney Docket No. 010577-039400/TA 402) which is hereby incorporated by reference for all purposes. Data filtered by that filter will be PUT( ) to the QIO queue filter of the TCP monitor process 222a.

Now a client 111a–b attempts a connection with the IP address 200.9.1.1. with the port AAAA. The internetwork 121 routes the initial packet and directs it either to the adapter 130a via the router 210a or to the adapter 130b via the router 210b. The (identical) filters in the two adapters route the packet to processor 110a.

Assuming that the adapter 130a receives the packet, that adapter forwards the packet to the processor 110a, invoking the PUT( ) routine for the appropriate queue, executing the input processing code in the TCP/IP library. That code recognizes that the packet is a "connect" request and queues the packet for the TCP monitor process 222a on the processor 110a. This act of queuing awakens the TCP monitor process 222a.

Using the information which the application process 220a previously provided, the TCP monitor process 222a then updates the socket state as necessary and uses the FMP to add another filter to both of the adapters 130a–b. This new, additional filter contains not only the local IP address but also the port being listened on and the remote IP address and remote port number from which the connection was established. It also has associated with it the QIO queue for the application 220a. That queue also has a PUT( ) routine associated with it which invokes code from the TCP/IP library. The TCP monitor process uses the PUT( ) routine to queue the completion to the listen to the process' input queue, causing the process 220a to wake up.

Now, when either adapter 130a, b receives a packet for routing, it deploys the more specific filter set up above. For a packet routed on the same connection between the client 111a and the processor 110a, the local IP address and port and the foreign IP address and port all match the filter, and the adapter 130a, b routes the packet to the processor 110a to the inbound queue for the application process 220a. Invoking the PUT( ) routine causes the TCP/IP library code to execute. That code examines the packet and determines that it is input data, updates socket states as necessary and sets further state so that an acknowledgment occurs. The code then determines whether the socket is a QIO socket or a socket compatible with the 4.3 BSD version of UNIX. (4.3 BSD sockets are described in Leffler, *The Design of the 4.3 BSD UNIX Operating System* (Addison-Wesley, 1989))

Where the socket is a QIO socket, the library routine queues the data on the QIO queue associated with the socket. This results in the process 220a waking up and processing the data directly from the QIO buffer.

Where the socket is a BSD-compatible socket, the library routine queues the data on the socket and wakes up the application process 220a. The application process 220a wakes up, performs a RECEIVE( ) socket library call, transferring the data from the socket to the application (either by remapping or by copying).

When the connection is closed, the TCP monitor process 222a in the processor 110a uses the FMP to delete the IP-Address/Port-Pair filter associated with the socket from the adapters 130a–b.

(Where the application process is one that is served by a common LISTENER process which spawns a process instance of the application through fork( ) or equivalent means, the LISTENER process runs on a specific processor and creates a socket for the port on which it is listening. It binds these ports to the sockets. The TCP monitor process 222a–c in that processor 110a–c will have created IP-Address/Port-destination filters for each of the sockets.)

Thus, a client 111a–b can address a packet to any of the multiple processors 110a–c of the cluster 250 without knowledge of or concern for which of the specific processors 110*a*, 110*b*, 110*c* actually receives the packet. The cluster 250 of processors 110*a*–*c* appears as a single internet protocol image (a "logical host" or "virtual host").

Data Structures

The data structures and protocols used in one embodiment to achieve the appearance of a single internet protocol image of the invention are described below. The data structures and protocols for filters are further described in the related U.S. patent application Ser. No. 09/135,027 (Attorney Docket No. 010577-039400/TA 402). U.S. patent application Ser. No. 09/135,027 (Attorney Docket No. 010577-039400/TA 402) is incorporated herein by reference.

The local and global QIO data structures and protocols are described in U.S. patent application Ser. No. 08/578,411, filed Dec. 20, 1995, entitled, "Computer System Data I/O By Reference Among CPUs and I/O Devices," naming Leonard R. Fishler, et al. as inventors, with Attorney Docket No. 010577-039400/TA 344) U.S. patent application Ser. No. 08/578,411 is incorporated herein by reference.

Figure 3:
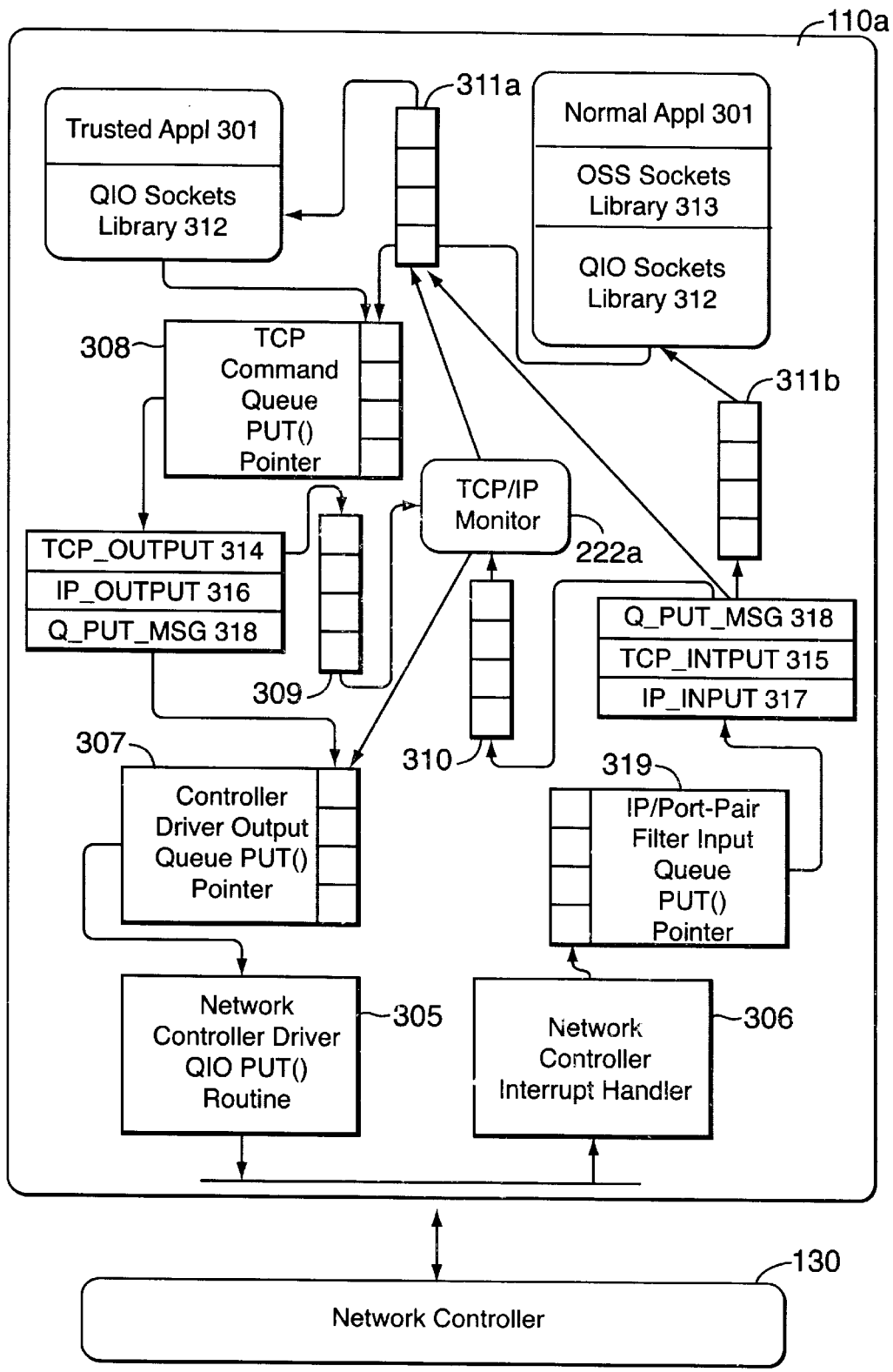
FIG. 3 is a more detailed view of a processor of the cluster of FIG. 2A.

A number of QIO queues support the invention. FIG. 3 is a more detailed view of a processor 110 of the cluster 250 of FIG. 2A. The TCP/IP command queue 308 is the local QIO queue to which the QIO sockets library routines 312 put requests. The per-processor TCP monitor process 222 creates the command queue 308, and thus there is one per processor in the logical host 250. The "PUT" routine that the TCP monitor process 222 supplies is an entry in the IP_INPUT TCP/IP library routines 317.

The network interface driver output queue 307 is a local QIO queue that the QIO clients of the driver use for output. The driver creates the output queue 307, typically at initialization. When a client registers with the driver, it receives a pointer to the output queue 307. Usually, there is one output queue 307 per processor per interface. (Whether the interface is logical or physical depends on the I/O controller.)

The TCP monitor process 222 creates the IP/Port-Pair-Filter input queue 319 when it processes the completion of a connection on a bound socket. Typically, there is one IP/Port Pair Filter input queue 319 per processor 110*a*, shared by all the sockets within the processor 110*a*. When the processor 110*a* directs the network controller to create an IP/TCP_PORT_PAIR filter and to forward such packets or frames as pass the filter to itself 110*a*, the processor specifies this global QIO queue 319 as the destination queue for the packet.

Application completion queues 311*a*, *b* are local QIO queues that receive QIO sockets library completion and indication message descriptors (MDs). A QIO sockets trusted Application 301 creates its application completion queues 311*a* directly. The OSS Sockets library 313, however, indirectly creates completion queues 311*b* on behalf of an ordinary sockets client 302.

The TCP monitor's private command queue 309 is the local QIO queue that the TCP/IP library 314 through 317 uses when necessity defers execution and output processing passes to the TCP monitor process 222. This can occur when, for example, there are resource shortages or when a window is full, forcing the deferral of output. There is one TCP monitor private command queue 309 per TCP monitor process 222, that is, one per processor in the virtual host 250. The TCP monitor 222 process creates this queue.

Likewise, the TCP/IP library 314 through 317 uses the local QIO TCP monitor input queue 310 when necessity defers input processing. Such deferral can occur when, for example, there are resources shortages or when input processing is too long to handle in the interrupt handler. There is one TCP monitor input queue 310 per TCP monitor process, that is, one per processor in the logical host 250. The TCP monitor process 222 creates this queue as well.

Protocols

A REGISTER_FILTER( ) routine creates a filter on a specified network adapter. Accordingly, REGISTER_FILTER( ) accepts as input the identities of a network adapter, a control QIO queue, and inbound and outbound QIO queues. The identified network adapter is the adapter where the filter is to be added. The control queue receives system status messages (e.g., notification that the interface is down). A user may optionally disable the reception of such information by providing a NULL pointer. (REGISTER_FILTER( ) invokes the QIO SM_DR_REGISTER( ) routine described in U.S. patent application Ser. No. 08/578, 411.)

REGISTER_FILTER( ) additionally accepts the name, class and type (or sub-class) of the filter to add, as well as a receive tag and the name of the parent filter where the filter is to be attached in the filter tree on the adapter. The receive tag is returned with data received by this filter, allowing clients to direct the output from multiple filters to single QIO queue and still identify the sources. (In one embodiment, both filter names are eight-bytes long and null-terminated.)

The TCP monitor process 222 calls REGISTER_FILTER( ) which communicates as necessary with the indicated adapter to create the indicated filter on the adapter.

The 4.3 BSD-compatible sockets library 313 is a library of routines that provide a standard sockets interface. This is the sockets library that normal applications 302 use. As FIG. 3 illustrates, the QIO sockets library 312 implements the 4.3 BSD-compatible sockets library 313. The library 313 copies or re-maps user buffers to and from the QIO MDs and buffers.

The QIO sockets library 312 is a library of routines that are semantically similar, though not syntactically identical, to the standard sockets library. The QIO sockets library is not for general usage. Only trusted sockets applications as described herein use the library. When using this library, buffers for I/O are allocated using QIO, out of the QIO segment, using the QIO routine for retrieving a message descriptor (SM_MD_GET_U, described in U.S. patent application Ser. No. 08/578,411).

TCP_OUTPUT( ) 314 is the main output routine for the TCP protocol. When putting TCP commands or data, the QIO sockets library 312 invokes TCP_OUTPUT( ) 314 by putting the command or data onto the TCP/IP command queue 308. The PUT( ) routine for the command queue 308 is the TCP_OUTPUT( ) routine, which processes the command or data, passing them on to the IP_OUTPUT( ) routine 316, but possibly passing them on the TCP monitor's private command queue 309 as described above. For example, TCP_OUTPUT( ) 314 adds the TCP protocol header information to such data as is destined for the network. (A similar routine, UDP_OUTPUT( ) (not shown), would be used for the UDP datagram service.)

IP_OUTPUT( ) 316 is the main output routine for the IP protocol underlying TCP (and UDP). TCP_OUTPUT( ) 314 invokes IP_OUTPUT( ) 316 to further process data destined for the network. For example, IP_OUTPUT( ) 316 adds the IP protocol header information.

IP_OUTPUT( ) 316 invokes the local Q_PUT_MSG( ) routine 318 to move the data as processed by IP_OUTPUT( ) 316 to the output queue 307 for the network controller driver. The PUT( ) routine for the driver output control queue 307 is the routine 305, which moves the data out of the processor 110*a* into the network adapter 130*a*, *b*. One such method of data movement between host and controller is the global QIO mechanism, described in U.S. patent application Ser. No. 08/578,411.

On the receive side, the driver in the processor 110*a* receives data from the network adapter 130, processes that data and passes it on to the application 301 or 302. The driver receives data by interrupt, but a polling mechanism is also possible.

The interrupt handler 306 within the processor 110*a* for the network controller 130 receives the data from the adapter 130 and places that data onto the IP/Port-Pair Filter input queue 319 whose Q_PUT_MSG( ) routine is IP_INPUT( ) 317. (The interrupt handler 306 also has the responsibility for continuing queued I/O if output was deferred due to resource, protocol or hardware constraints or the like.)

IP_INPUT( ) 317 is the main input routine for the IP protocol underlying TCP (or UDP). IP_INPUT( ) 317 is the mirror routine for IP_OUTPUT 316. It processes data by stripping the IP header information from the data and passes the processed data on to TCP_INPUT( ) 315 (or UDP_INPUT (not shown)).

TCP INPUT( ) 315 is the main input processing routine for the TCP protocol. It strips the TCP header information off of the received data and invokes the local Q_PUT_MSG( ) routine 318 to place the data on an application completion queue 311*a*, 311*b*.

Q_PUT_MSG( ) 318 is the QIO library routine that puts an MD onto a queue. Q_PUT_MSG_( ) 318 receives as input a queue identifier and a pointer to a PUT( ) routine for that queue. Q_PUT_MSG( ) 318 is further described in U.S. patent application No. 08/578,411.

The invention maintains trusted and normal sockets applications 301 and 302, respectively. Trusted socket applications 301 directly use the high performance QIO sockets interface. They allocate buffers from QIO space, have full addressability to the QIO flat segment and have the best performance possible. They also use the special QIO sockets library 312. (For example, in the QIO sockets library 312, there are no "receive" calls required. There is always an implied receive for those applications 301, as long as there are QIO resources available.) These trusted applications 301 support the full local QIO (zero copy) architecture, and, optionally, global QIO (I/O by reference). Only those applications that are critical for strategic, competitive or performance reasons, for example, are made trusted applications. Some amount of vulnerability to processor crashes (due to errant code) and long-term higher maintenance costs are traded off for best performance.

Normal 4.3 BSD-compatible sockets applications are the set of normal user-level applications that use these sockets. They allocate buffers in their own address space and issue sockets library calls. They do not have performance requirements as critical as the trusted sockets applications and, therefore, can tolerate buffer copying to and from their address space to the QIO segment space.

The TCP/IP monitor process 222*a–c* exists within every processor 110*a–c* in the system 250. There is one per processor per virtual host. The TCP/IP monitor process 222*a–c* is normally not in the data path, except, for example, where necessity defers an output operation or where an input operation is too lengthy to be performed at the interrupt level.

As FIG. 2A illustrates, the TCP/IP monitor process shares code with the application processes 220, 301, 302 in its processor. That shared code is the library portion of TCP/IP. The TCP/IP monitor process 222*a–c* also shares context, contained within the QIO segment address space. That shared context includes, but is not limited to, socket control blocks, protocol control blocks, etc.

The TCP/IP management process 221*b, c* (in one embodiment a process pair of primary and backup processes 221*c* and 221*b*, respectively) functions as a central point of control, management and context for the TCP/IP subsystem. There is one TCP/IP management process per virtual host. It is the target for management requests. It also is the default handler for non-data-flow IP traffic (ARP, ICMP, etc.) as well as for traffic that cannot be associated with a particular processor 110. Non-processor-specific traffic includes connection requests for unbound ports and UDP fragments that cannot be associated with a port due to out-of-order receipt (see below).

In one embodiment, the invention includes an IPv4- or IPv6-compliant stack.

Application-Side Considerations

The construction of an application to take advantage of the architecture disclosed herein is described below.

Two sets of application programming interfaces (APIs) are supported: the 4.3 BSD-compatible sockets API and the local QIO API.

Two types of applications are considered. One is a simple server that does everything in the same processor. The other is a distributed server that gets connections routed to some sort of distributor process and then hands off the connection to another process on another processor.

In the case of the single processor server designed for maximum performance, no changes are necessary from the current local QIO API. Here, however, the application does not need to locate itself in any particular processor with respect to TCP/IP services. The application always is in a processor that has a TCP/IP service with which it can talk via QIO.

For a distributed server, a process termed a "distributor" opens a socket and listens on a well-known port. After a connection is made, the distributor passes the socket to another process which creates a new socket using socket_nw( ) and accept_nw2( ). Data transfer then occurs on this new socket. The foregoing entails creating a new IP/Port-Pair filter in the other processor, as well as a queue in the new processor associated with the new application process. It also implies the destruction of the original IP/Port-Pair filter.

In an alternative embodiment, the second process is capable of some initial data transfer and thereafter hands the same socket off to yet another process in another processor. For 4.3 BSD-compatible sockets, the UNIX® domain file descriptor passing mechanism suffices to get the socket file descriptor from one processor to another. The filesystem notifies the TCP/IP service in the new processor of the migration of the socket. When a QIO API socket migrates to another processor, the respective TCP/IP services close out the socket in the old processor and add a filter in the adapters for the new processor.

Scenario Revisited

As described above, on system start-up, the system administrator informs the system 250 of its IP address and of the local IP address for TCP/IP management process 221*c* at system configuration time. The network adapters 130*a–b* set up default filter trees known or communicated to the logical host 250.

The parallel I/O management process then sets up a filter tree in the network adapters 130*a–b*, indicating that packets destined for the system 250 are to be directed to a specific QIO queue on processor 110*c* that the parallel I/O management process 221*c* created.

To accomplish this, the TCP/IP management process 221*c* invokes REGISTER_FILTER( ), passing parameters indicating that a DESTINATION_IP_ADDRESS sub-class filter is to be added to the filter tree, as well as a leaf filter whose branch value is the IP address of 200.9.1.1. The leaf filter indicates the process 221c is to receive all packets destined for 200.9.1.1.

The code or hardware in a network adapter 130a–b examines the filter tree as it analyzes packets from the network. Packets that contain the 200.9.1.1 IP address it segregates and sends to the processor 110c via the system area/cluster network 120, as the tree directs.

The network controller interrupt handler 306 queues the packet based upon the filter information to the input queue of the TCP management process 221c.

(Packets destined for the general IP address 200.9.1.1 that are administrative in nature (such as ICMP packets, routing information and network management) queue to the input queue for the TCP management process 221c in processor 110c, regardless of the more specific filters that are added to the filter tree over time. Also, packets that lower-level filters cannot resolve also go to processor 110c, as along as the packets pass the basic DESTINATION_ADDRESS filter.

The first hop routers 210a–b are told where to route packets bound for the network 200.9.x.x. Adding static routes to the routers can accomplish this, though this is a manual intervention that would not otherwise be necessary for another machine with a single IP address. Other well-known methods can be used to inform the routers. For example, routing protocols advertising the routes can update the routers.)

Figure 4A:
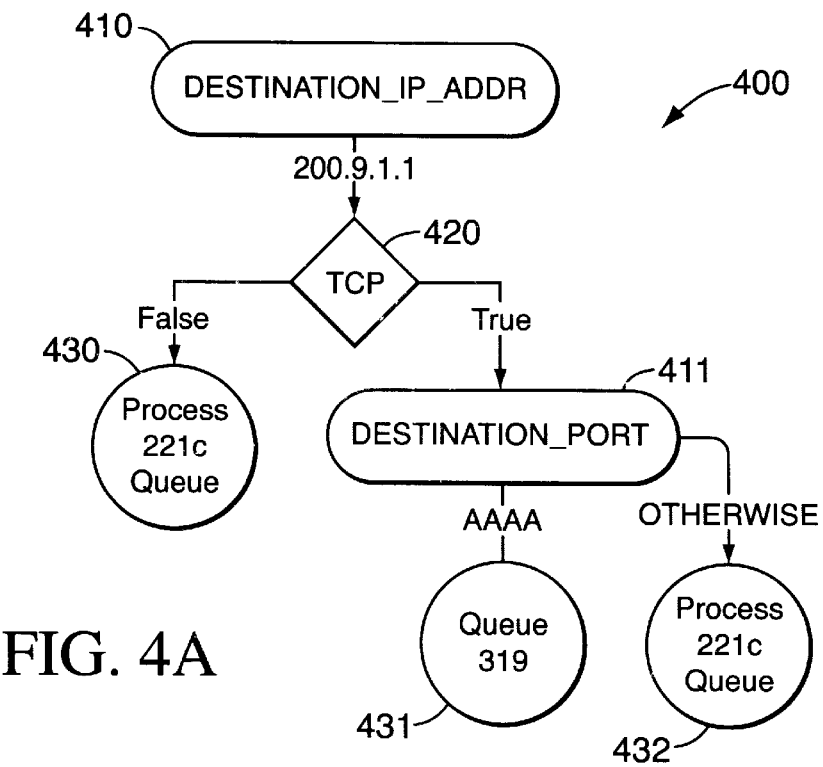
FIGS. 4A and 4B are example filter trees.

Now, application process 220a informs the TCP monitor process 222a in processor 110a that it is listening on the port AAAA. The TCP monitor process 222a invokes REGISTER_FILTER ( ) to modify the filter tree in the network adapters 130a–b to create the filter tree 400 of FIG. 4A.

The filter 410 tests a packet for the destination IP address 200.9.1.1. When found, the filter 420 tests the packet for the TCP protocol. If the packet is not using the TCP protocol, the filter 430 routes the packet to the queue for the TCP management process 221c on the processor 110c. If the TCP port is AAAA, the DESTINATION_PORT case filter 411 and the leaf filter 431 route the packet to the queue for the TCP monitor process 222a on the processor 110a. Otherwise, the packet is routed via the leaf filter 432 to the TCP management process 221c.

Associated with the queue for the TCP monitor process 222a is its PUT( ) routine. This PUT( ) routine is part of the TCP/IP library code and performs some of the processing of the packet and wakes up the monitor process 222a.

Next, the client 111 attempts to connect with port AAAA at IP address 200.9.1.1. This new filter 400 in the network adapters 130 routes the packet directly to the processor 110a to the TCP monitor process queue associated with that filter. Putting the packet on the queue invokes the TCP/IP library code to process that packet, which identifies the packet as a connection request. The code queues the packet for the TCP monitor process 222a, waking that process.

Figure 4B:
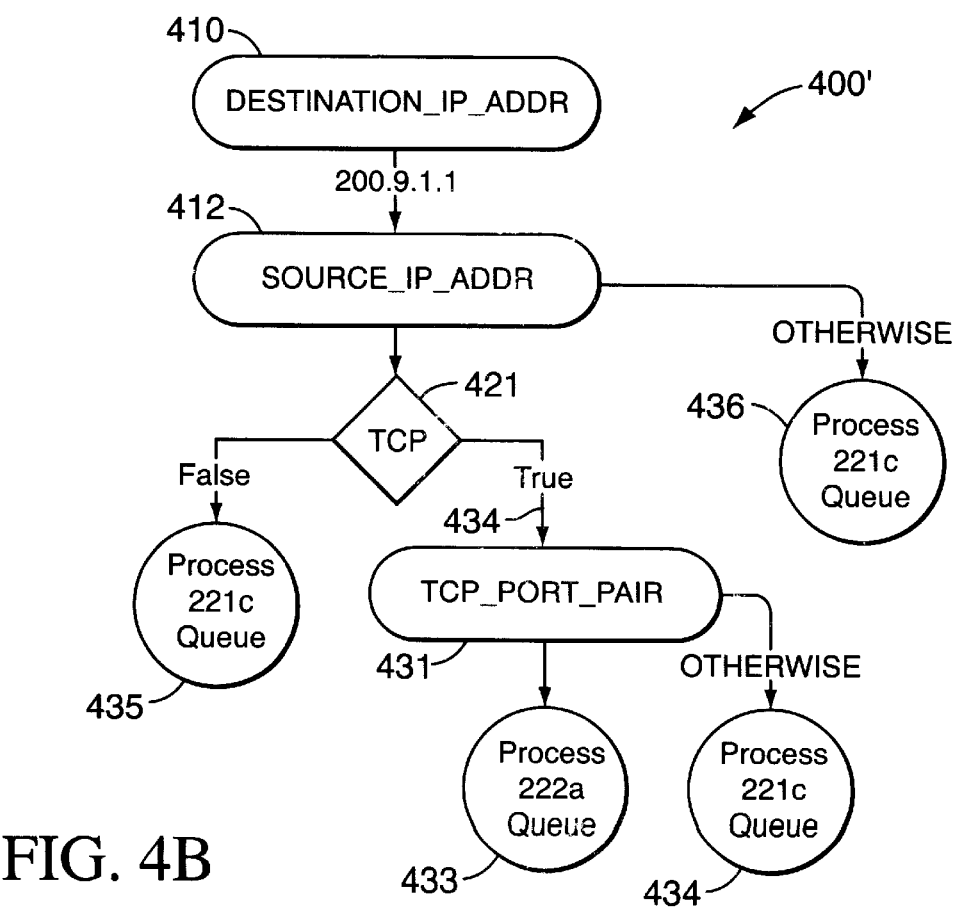

The awakened TCP monitor process 222a updates the socket states as necessary and uses the FMP to further modify the filter tree in the adapters producing the filter tree 400' of FIG. 4B. The TCP monitor process 222a inserts a TCP_PORT_PAIR sub-class case filter 431 and a SOURCE_IP_ADDRESS sub-class case filter 412 between the pre-existing DESTINATION_IP_ADDRESS sub-class case filter 410 and the filter leaf 433 indicating that the queue 319 on processor 110a is the destination for this packet. The TCP_PORT_PAIR filter 431 tests for the pair of ports the process 220a and the client 111 are using for this connection, and the SOURCE_IP_ADDRESS filter 412 tests for the source IP address which is the client 111.

Also, the TCP monitor process 222a queues the completion to the listen to the application process 220a, waking up that process.

As a result of filter tree 400', the adapters 130a–b check the source and destination IP addresses and the TCP port pair for a match for the established connection. When such a match is found, the adapters 130a–b route the packet to the processor 110a to the queue 319 for the application process 220a.

Closing the socket results in calls to DELETE_FILTER( ) to remove the filters added to the filter tree to support the connection.

Socket Migration

The migration of a socket from one processor to another by the application that is performing data transfer on the socket is handled by having a socket-owner processor. A socket created in a particular processor is owned by that processor's TCP monitor process. If the socket migrates to another processor, the owner processor does not change. That processor retains information about the destination processor of the socket migration. No new filters are set up for the processor to which the socket has migrated.

If a recv( ) is posted in the destination processor, this fact is communicated to the TCP monitor process of the owner processor for that socket. When the owner processor receives a data packet, it forwards that packet to the processor on which the recv( ) is posted.

An application normally uses a socket one process at a time. Thus, after a socket migrates, the parent usually closes it. A close of the socket on the owner processor transfers ownership of the socket to a processor on which the socket is still open. This transferring of ownership causes the TCP monitor process of the processor of the destination of the socket to set up a filter with the network adapters equivalent to the filter used by the previous owner of the socket but with the new processor's identification.

IP Re-Assembly

The IP protocol supports the ability to divide (i.e., fragment) a single packet into several smaller ones. The Network File System (available from Sun Microsystems of Mountain View, CA) over UDP commonly uses this technique. Packet fragmentation presents a unique problem for filters since filters rely upon processing protocol headers at fixed offsets. In a fragmented packet, only the first fragment (frame) will have the necessary protocol headers. The subsequent fragments will have only an IP header.

Two solutions to this problem are presented below: IP fragment reassembly, and dynamic fragment ID routing. These solutions are discussed in turn.

The first solution is to reassemble the fragments inside the adapter. The entire reassembled packet is then routed using standard filter methods.

A single fragment reassembly filter is inserted into the filter tree. This special filter recognizes fragmented IP frames and queues them. When the filter obtains a complete packet, it passes the reassembled packet to the next filter in the tree.

This solution requires a timer for each fragmented packet and additional memory to hold multiple fragments until a complete packet arrives. Also, reassembly may be difficult to implement in a network adapter that does not operate in a store-and-forward manner.

An alternative solution is to route IP fragments by their IP fragment ID. According to the protocol, when a packet is fragmented, a unique 16-bit number (fragment ID) is assigned. Each of the individual fragments (frames) has this ID in its IP header so that the receiver can reassemble the packet. The first fragment contains both the fragment ID and the necessary headers. When receiving such a first fragment, a filter is created to route the remaining fragments to their proper destination.

Figure 5:
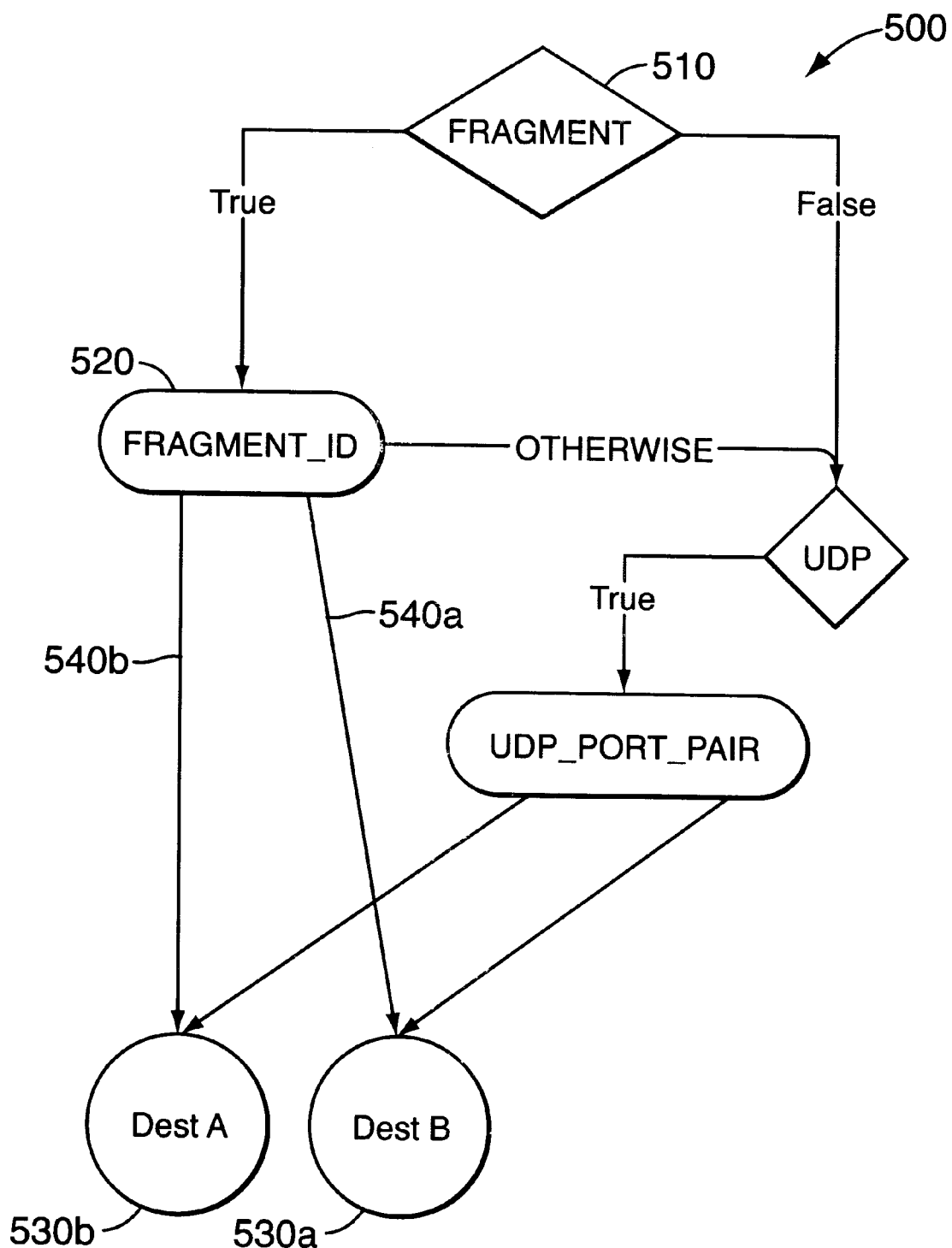
FIG. 5 illustrates a filter tree for dynamic fragment ID routing.

FIG. 5 illustrates a filter tree 500 for dynamic fragment ID routing. The test is directed by the FRAGMENT if filter node 510 is TRUE when a packet is part of a fragment. The FRAGMENT_ID case filter node 520 fans-out on the fragment ID.

In this scheme, the first fragment has an unrecognized fragment ID. It falls through the "otherwise-case" of the FRAGMENT_ID case filter 520. Since this fragment contains the necessary protocol headers, the filtering software routes it to its proper destination 530a, b. The adapter then adds a link 540a, b into the FRAGMENT_ID case filter table so that subsequent fragments with this ID will be routed to the same destination 530a, b as the first fragment. When all the fragments have been received, the adapter deletes the link 540a, b.

This approach requires setting a timer for each fragmented packet and assumes that the last fragment is received last (to tell when to stop forwarding fragments). If a new first fragment is received from the same IP/Port, it again assumes the end of a fragment. This approach also requires that the first fragment arrive at the adapter first and assumes that all fragments arrive on the same adapter.

(The leaf filter N_530b, for example, cannot have both the FRAGMENT ID case filter and the UDP_PORT_PAIR filter as its parent node. This would violate the definition of a true. Thus, FIG. 5 represents a tree having the same effect.)

Of course, the program text for such software as is herein disclosed can exist in its static form on a magnetic, optical or other disk, on magnetic tape or other medium requiring media movement for storage and/or retrieval, in ROM, in RAM or other integrated circuit, or in another data storage medium. That data storage medium may be integral to or insertable into a computer system.

Also, the embodiments described herein are by way of example and not limitation. Modifications to the invention as described will be readily apparent to one of ordinary skill in the art. For example, in a recursive application of the invention, any of the processors 110a, 110b, ..., 110n may itself be a virtual host. Therefore, the scope of the invention is defined by the claims which follow:

What is claimed is:

1. A method of directly routing network packets with headers to destination processors in a cluster of processors, wherein the cluster is connected to a network by one or more network adapters, said method comprising the steps of:

assigning a selected network address to the cluster;

configuring a network adapter to direct all network traffic addressed to said selected network address to a primary management process running on a first processor in said cluster;

listening at a second processor in said cluster to a selected port;

informing the primary management process that the second processor is listening to the selected port;

causing a network monitor process running on said second processor to configure said adapter to route packets attempting to connect with said selected port to a queue in said second processor;

processing, at said second processor, a packet from a client, having a client network address, the packet requesting a connection between a connection port pair including said selected port and a designated port on the client;

causing said network monitor process running on said second processor, to modify said network adapter to test source and destination network addresses and a port pair in packet;

if the source and destination network address match the selected and client network address and the port pair matches the selected and designated ports, routing the packet directly from the network adapter to the queue at the second processor without inter-processor copying; and otherwise, routing the packet directly from the network adapter to the primary management process.

2. A method for presenting a plurality of processors as a single virtual host to a network having at least one client connected thereto, the method comprising the steps of:

communicatively coupling the plurality of processors to the network by means of a network adapter;

establishing on the network one network address for the plurality of processors;

designating a first processor to run a primary management process;

registering a filter in the network adapter to cause all packets containing the one network address to be sent to the first processor;

causing a second processor to listen on a selected port and to so inform the primary management process;

designating the second processor to run a monitor process that registers a filter in the network adapter to cause packets from a particular client connected to the network containing the selected port to be sent to the second processor;

receiving a packet having a network address and client port from the particular client and requesting a connection to the selected port at the second processor; and upon receiving the request packet, causing the monitor process on the second processor to register one or more filters in the network adapter that cause only packets containing the one network address, the selected port, the client network address and the client port to be thereafter sent to the selected port on the second processor.

3. A method for presenting a plurality of processors as a single virtual host as recited in claim 2, wherein the step of causing the second processor to listen on a selected port includes setting up a queue in the second processor to receive packets bound for the selected port; and wherein the step of designating the second processor includes causing the filter that sends packets to the second processor to send the packet to the queue in the second processor.

4. A method for presenting a plurality of processors as a single virtual host as recited in claim 2, wherein packets directed to the one network address and received by the network adapter are fragmented; and further comprising:

receiving and storing all of the fragments of each said packet at the network adapter;

assembling the fragments in the network adapter to re-form said packet; and sending, according to the filters in the network adapter, said packet from the network adapter to a destination processor in the plurality of processors.

5. A method for presenting a plurality of processors as a single virtual host as recited in claim 2,
wherein packets directed to the one network address and received by the network adapter each include a first fragment and subsequent fragments; and
further comprising:
receiving said first packet fragment at the network adapter;
routing said first packet fragment to a destination processor in the plurality of processors, according to the filters in the network adapter;
creating an additional filter in the network adapter based on said first packet fragment; and
routing, according to the additional filter, said subsequent packet fragments to said destination processor based on the additional filter.

6. A computer program product comprising:
a computer usable medium having computer readable program code means embodied therein for directly routing network packets with headers to destination processors in a cluster of processors, wherein the cluster is connected to a network by one or more network adapters, the computer readable program code means in said computer program product comprising:
computer readable code means for assigning a selected network address to the cluster;
computer readable code means for configuring a network adapter to direct all network traffic addressed to said selected network address to a primary management process running on a first processor in said cluster;
computer readable code means for listening at a second processor in said cluster to a selected port;
computer readable code means for informing the primary management process that the second processor is listening to the selected port;
computer readable code means for causing a network monitor process running on said second processor to configure said adapter to route packets attempting to connect with said selected port to a queue in said second processor;
computer readable code means for processing, at said second processor, a packet from a client, having a client network address, the packet requesting a connection between a connection port pair including said selected port and a designated port on the client;
computer readable code means for causing said network monitor process running on said second processor, to modify said network adapter to test source and destination network addresses and a port pair in packet;
computer readable code means for routing the packet directly from the network adapter to the queue at the second processor without inter-processor copying, if the source and destination network address match the selected and client network address and the port pair matches the selected and designated ports; and
computer readable code means for routing the packet directly from the network adapter to the primary management process, otherwise.

7. A computer program product comprising:
a computer usable medium having computer readable program code means embodied therein for presenting a plurality of processors as a single virtual host to a network having at least one client connected thereto, the plurality of processors being communicatively coupled to the network by means of a network adapter, the computer readable program code means in said computer program product comprising:
computer readable code means for establishing on the network one network address for the plurality of processors;
computer readable code means for designating a first processor to run a primary management process;
computer readable code means for registering a filter in the network adapter to cause all packets containing the one network address to be sent to the first processor;
computer readable code means for causing a second processor to listen on a selected port and to so inform the primary management process;
computer readable code means for designating the second processor to run a monitor process that registers a filter in the network adapter to cause packets from a particular client connected to the network containing the selected port to be sent to the second processor;
computer readable code means for receiving a packet having a network address and client port from the particular client and requesting a connection to the selected port at the second processor; and
computer readable code means for causing, upon receiving the request packet, the monitor process on the second processor to register one or more filters in the network adapter that cause only packets containing the one network address, the selected port, the client network address and the client port to be thereafter sent to the selected port on the second processor.

8. A system for communication with a client on a network, comprising:
a plurality of processors grouped as a cluster; and
a network adapter configured to connect said plurality of processors to said network, and to route network packets with headers that include a selected network address to said cluster;
wherein a first processor in said plurality is configured to:
assign a selected network address to the cluster;
configure a network adapter to direct all network traffic addressed to said selected network address to a primary management process running on said first processor; and
wherein a second processor in said plurality is configured to:
listen to a selected port;
inform the primary management process that said second processor is listening to the selected port;
cause a network monitor process running on said second processor to configure said adapter to route packets attempting to connect with said selected port to a queue in said second processor;
process a packet from a client, having a client network address, the packet requesting a connection between a connection port pair including said selected port and a designated port on the client;
cause said network monitor process, to modify said network adapter to test source and destination network addresses and a port pair in packet;
route the packet directly from the network adapter to the queue at the second processor without inter-processor copying, if the source and destination network address match the selected and client network address and the port pair matches the selected and designated ports; and route the packet directly from the network adapter to the primary management process, otherwise.

9. A system for communication with a client on a network, comprising:

a plurality of processors grouped as a cluster; and a network adapter configured to connect said plurality of processors to said network, and to route network packets with headers that include a selected network address to said cluster;

wherein a first processor in said plurality is configured to:

establish on the network one network address for the plurality of processors;

run a primary management process;

register a filter in said network adapter to cause all packets containing the one network address to be sent to said first processor; and wherein a second processor in said plurality is configured to:

listen on a selected port and to so inform the primary management process;

run a monitor process that registers a filter in said network adapter to cause packets from a particular client connected to the network containing the selected port to be sent to said second processor;

receive a packet having a network address and client port from the particular client and requesting a connection to the selected port at said second processor; and register, upon receiving the request packet, one or more filters in said network adapter that cause only packets containing the one network address, the selected port, the client network address and the client port to be thereafter sent to the selected port on said second processor.

* * * * *

UNITED STATES PATENT AND TRADEMARK OFFICE
CERTIFICATE OF CORRECTION

PATENT NO. : 6,370,583 B1
DATED : April 9, 2002
INVENTOR(S) : Fishler et al.

It is certified that error appears in the above-identified patent and that said Letters Patent is hereby corrected as shown below:

Column 1,
Line 16, reads "nication fra such networks." it should read -- nication frames such on networks. --;
Line 67, reads "it using standard Internet protocols (e.g. TCP/IP, IJDP/IP)" it should read -- it using standard Internet protocols (e.g. TCP/IP, IJDP/IP). --.

Column 2,
Line 9, reads "Requests for Comments (RFCs) 791, 793 and 768. RFCs" it should read -- Requests for Comments (RFCs) 791, 793 and 768. --;
Line 10, "791, 793 and 768.)" should be deleted.

Column 3,
Line 44, reads "the system 25D takes this information and directs the" it should read -- the system 250 takes this information and directs the --;
Line 66, delete "(Attorney Docket No. 010577-039400/TA 402)".

Column 5,
Line 10, delete "(Attorney Docket";
Line 11, delete "No. 010577-039400/TA 402).";
Line 12, delete "(Attorney Docket No. 010577-039400/TA";
Line 13, delete "402)";
Line 18, delete "with Attorney Docket No.";
Line 19, delete "010577-039400/TA 344)".

Column 7,
Line 10, reads "the network controller 130 receives the data from the adapter" it should read -- the network adapter 130 receives the data from the adapter --.

UNITED STATES PATENT AND TRADEMARK OFFICE
CERTIFICATE OF CORRECTION

PATENT NO.   : 6,370,583 B1
DATED        : April 9, 2002
INVENTOR(S)  : Fishler et al.

It is certified that error appears in the above-identified patent and that said Letters Patent is hereby corrected as shown below:

Column 10,
Line 5, reads "tion to the listen to the application process 220a, waking up" it should read -- tion to listen to the application process 220a, waking up --.

Signed and Sealed this

Thirteenth Day of May, 2003

JAMES E. ROGAN
*Director of the United States Patent and Trademark Office*